(12) United States Patent
Fell (10) Patent No.: US 7,958,781 B2
(45) Date of Patent: Jun. 14, 2011

(54) VIBRATING STRUCTURE GYROSCOPE (75) Inventor: Christopher Paul Fell, Devon (GB)

(73) Assignee: Atlantic Inertial Systems Limited, Plymouth, Devon (GB)

( * ) Notice: Subject to any disclaimer, the term of this patent is extended or adjusted under 35 U.S.C. 154(b) by 493 days.

(21) Appl. No.: 12/066,024

(22) PCT Filed: Dec. 6, 2007

(86) PCT No.: PCT/GB2007/050744
§ 371 (c)(1),
(2), (4) Date: Mar. 6, 2008

(87) PCT Pub. No.: WO2008/072008
PCT Pub. Date: Jun. 19, 2008

(65) Prior Publication Data
US 2010/0218606 A1    Sep. 2, 2010

(30) Foreign Application Priority Data

Dec. 15, 2006 (EP) ..................................... 06270101
Dec. 15, 2006 (GB) ................................... 0625005.4

(51) Int. Cl.
*G01P 9/04* (2006.01)
(52) U.S. Cl. .................................................... 73/504.13
(58) Field of Classification Search ............... 73/504.13, 73/504.12, 504.04, 504.02, 504.15
See application file for complete search history.

(56) References Cited

U.S. PATENT DOCUMENTS

| | | | | |
|---|---|---|---|---|
| 3,924,475 A | * | 12/1975 | Stiles | 74/5.6 A |
| 5,616,864 A | * | 4/1997 | Johnson et al. | 73/504.04 |
| 5,831,162 A | * | 11/1998 | Sparks et al. | 73/504.12 |
| 6,151,964 A | * | 11/2000 | Nakajima | 73/504.13 |
| 6,343,509 B1 | * | 2/2002 | Fell et al. | 73/504.13 |
| 6,401,534 B1 | * | 6/2002 | Fell et al. | 73/504.13 |
| 7,123,111 B2 | * | 10/2006 | Brunson et al. | 331/116 M |
| 7,637,156 B2 | * | 12/2009 | Araki et al. | 73/504.13 |

FOREIGN PATENT DOCUMENTS

| | | |
|---|---|---|
| EP | 1 775 551 A1 | 4/2007 |
| WO | WO03/078302 A2 | 9/2003 |
| WO | WO2006/006597 A1 | 1/2006 |

* cited by examiner

*Primary Examiner* — Helen C. Kwok
(74) *Attorney, Agent, or Firm* — Scully, Scott, Murphy & Presser, P.C.

(57) ABSTRACT

A gyroscope structure 41 includes ring structure 42 supported from a central hub 43 by eight compliant support legs 44a to 44h. Primary drive transducers 45a and 45b and secondary drive transducers 46a and 46b are all located around and in spaced relationship with the external periphery of the ring structure 42 to create capacitive gaps and primary pick-off transducers 47a and 47b and secondary pick-off transducers 48a and 48b are all located around and in spaced relationship with the internal periphery of the ring structure 42 to create capacitive gaps. The gyroscope structure 41 includes sixteen capacitor plates 49a to 49p in spaced relationship to the ring structure 42 to create capacitive gaps. Two groups of capacitive plates 49a to 49d and 49i to 49l are all located around the internal periphery of the ring structure 42 and two groups of capacitor plates 49e to 49h and 49m to 49p are all located around the external periphery of the ring structure 42. Each capacitor plate 49a to 49p is arranged to generate a predetermined electrostatic force, which acts upon the ring structure 42 to locally adjust the stiffness of the ring structure 42.

The positioning of the transducers 45a to 48b and capacitor plates 49a to 49p reduces the effect of variation a capacitive gap with ring structure 42 due to temperature change, thereby improving the scalefactor of the gyroscope structure.

15 Claims, 3 Drawing Sheets

VIBRATING STRUCTURE GYROSCOPE

This invention relates to a vibrating structure gyroscope, which is particularly, but not exclusively, suitable for use in a Coriolis type gyroscope constructed using Micro-Electro-Mechanical Systems techniques.

Coriolis type gyroscopes, fabricated using Micro-Electro-Mechanical Systems (MEMS) technology, are now widely used for a range of high volume applications. For example, in the automotive industry such gyroscopes can be utilised in advanced braking systems, active suspension or rollover detection and prevention applications. The performance requirements of gyroscopes for such applications are relatively undemanding, particularly when compared to typical aerospace and military applications, where gyroscopes are used for guidance and control. The use of a MEMS type gyroscope in such demanding applications is relatively uncommon as a MEMS type gyroscope performance, in terms of the bias and scalefactor stability, is typically inadequate.

Figure 1A:
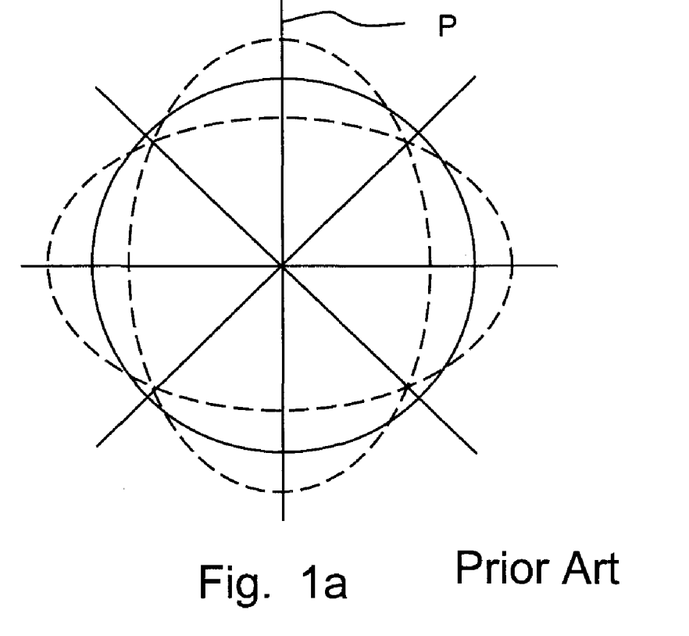
FIG. 1a schematically illustrates a gyroscope ring according to the prior art and the action of radial displacement of a primary carrier vibration mode.
Figure 1B:
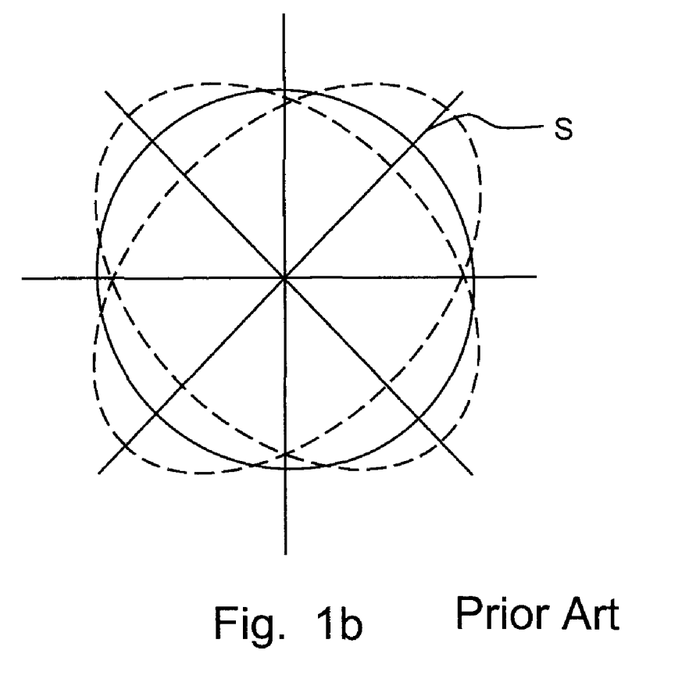
FIG. 1b schematically illustrates a gyroscope ring according to the prior art and the action of radial displacement of a secondary response vibration mode.

The device described in WO2006006597 is an example of a Coriolis type gyroscope formed using MEMS techniques and which is designed to meet the performance requirements of a high volume automotive application. This device operates using a cos $2\theta$ vibration mode pair as described with reference to FIGS. 1a and 1b of WO2006006597, reproduced herein as FIGS. 1a and 1b. In operation, one of these vibration modes is excited as a primary carrier mode as indicated by axis P, the extremities of which are illustrated in FIG. 1a as dashed lines, when the gyroscope is rotated around an axis normal to the plane of a planar silicon ring that forms the gyroscope, Coriolis forces are generated which couple energy into the other vibration mode as indicated by axis S, that is a secondary response mode, the extremities of which are illustrated in FIG. 1b as dashed lines. The amplitude of the induced motion in the response mode will be directly proportional to the applied rotation rate which acts on the gyroscope.

Such a gyroscope will typically be operated in a closed loop mode. In this mode, the primary carrier mode P is driven at the resonance maximum by a primary drive transducer connected to a Phase Locked Loop and the amplitude of motion is substantially maintained at a constant value using an associated Automatic Gain Control loop. The Automatic Gain Control loop is arranged to compare the amplitude of motion, as measured at a primary pick-off transducer, to a fixed reference level, and to dynamically adjust the drive level of the primary drive transducer to maintain a constant signal level and hence a constant amplitude of motion. This is important as the magnitude of the Coriolis force induced when the gyroscope is rotated, and hence the scalefactor, is directly proportional to the amplitude of the primary carrier mode motion. The Coriolis force will induce motion in the secondary response mode S which is detected using a secondary pick-off transducer and in a closed loop operating mode such motion is substantially nulled by means of a secondary drive transducer. It will be understood that the value of the drive force generated by the secondary drive transducer to maintain the null is a direct indication of the applied rotation rate due to Coriolis force acting on the gyroscope.

The accuracy and stability of such a gyroscope, in terms of the scalefactor, is therefore dependent upon the accuracy of the primary pick-off transducer and the secondary drive transducer. Variations in the gain of either the primary pick-off transducer or the secondary drive transducer will directly affect the scalefactor. For the device described in WO2006006597, the gains of both the primary pick-off transducer and the secondary drive transducer are largely determined by the stability of capacitor gaps between the planar silicon ring and the individual transducer plates associated with the primary pick-off transducer or the secondary drive transducer. These gaps are known to vary over the operating temperature range of the gyroscope due to the thermal expansion of the various materials from which the device is manufactured. In order to minimise the effect of temperature induced variations in the capacitor gaps, it is desirable, where possible, to manufacture the gyroscope from selected materials that have low and well matched coefficients of thermal expansion. However, thermal expansion of such selected materials still give rise to a significant variation in the scalefactor, which in turn limits the performance level that can be achieved by the gyroscope.

Devices utilising planar silicon ring structures, typically require that the cos $2\theta$ vibration mode frequencies, i.e. the frequencies of the primary carrier mode and the secondary response mode, are accurately matched. This gives maximum sensitivity as the motion induced by a Coriolis force is amplified by the quality factor of the secondary response mode. Amplification by the quality factor of the secondary response mode can be of the order of several thousands. MEMS fabrication processes are capable of producing planar silicon ring structures to a high degree of accuracy. However, small imperfections in the geometry of such a structure will typically give rise to a small residual frequency split between the primary carrier and secondary response mode frequencies. For the device described in International patent application number WO2006/006597, this frequency split can be compensated during operation of the device by the use of additional transducers, similar in construction to the drive transducers and pick-off transducers that are arranged externally to the planar ring structure. Each additional transducer is positioned internally of the planar ring structure. Accordingly, when a DC voltage offset is applied between a capacitor plate of an additional transducer and the planar silicon ring, an electrostatic force is generated that acts as a negative spring and allows the stiffness of the planar silicon ring to be locally adjusted. Therefore, the vibration mode frequencies can be differentially adjusted using such additional transducers to ensure that the vibration mode frequencies are accurately matched.

The electrostatic force applied by the additional transducers will be dependent upon the capacitor gap between the capacitor plate of the additional transducer and the planar silicon ring. Variation in the capacitor gap due to thermal expansion will cause a variation between the vibration mode frequencies over temperature causing a frequency split between the frequencies of the primary carrier and secondary response modes. Such a frequency split will typically induce oscillation of the secondary response mode, which is in phase quadrature, i.e. has a 90° phase relationship, to the motion induced by applied rotation rates, and can be present even when the device is not rotating. The magnitude of the signal induced by such motion can be large when compared to the required in-phase signal that is used to provide the rotation rate information. Recovering the required rotation induced signal in the presence of a large quadrature signal places stringent requirements on the phase accuracy of the detection system.

Accurately phased electronics enable the quadrature signal to be substantially rejected. However, practical limitations on the accuracy with which this phasing can be achieved means that some of the quadrature signal will typically remain to contaminate the true rotation induced in-phase signal. This limitation is a major source of bias error for this type of gyroscope.

SUMMARY OF THE INVENTION

According to an aspect of the invention, a vibrating structure gyroscope includes a semiconductor substrate, a vibrating planar ring structure, support means arranged to support the ring structure relative to the semiconductor substrate, the semiconductor substrate, ring structure and support means being arranged substantially co-planar with one another, at least one primary drive transducer arranged to cause the ring structure to oscillate in a primary mode at the resonant frequency of the primary mode, at least one primary pick-off transducer arranged to detect oscillation of the ring structure in the primary mode, at least one secondary pick-off transducer arranged to detect oscillation of a secondary mode induced when angular velocity is applied around an axis substantially perpendicular to the ring structure, at least one secondary drive transducer arranged to null the induced secondary mode oscillation, the primary and secondary drive transducers and the primary and secondary pick-off transducers all being arranged around the periphery of the ring structure and at least two oscillation frequency adjusting capacitor plates arranged around the periphery of the ring structure such that when a voltage is applied between at least one capacitor plate and the ring structure an electrostatic force is generated between the capacitor plate and the ring structure to differentially adjust the frequencies of the primary and secondary modes to reduce the difference between the frequencies of the primary and secondary modes, wherein at least one of the capacitor plates is located externally of the periphery of the ring structure and the other capacitor plate or capacitor plates are located internally of the periphery of the ring structure and at least one of the drive transducers or pick-off transducers are located internally of the periphery of the ring structure and the other drive transducer or drive transducers or pick-off transducer or pick-off transducers are located externally of the periphery of the ring structure.

The capacitor plates may be arranged in cooperating pairs and at least one capacitor plate of each cooperating pair of capacitor plates may be located externally of the periphery of the ring structure and the other capacitor plate of each cooperating pair of capacitor plates may be located internally of the periphery of the ring structure. Either the drive transducers or the pick-off transducers may arranged in pairs of cooperating transducers, and at least one transducer of each pair of cooperating transducers may be located internally of the periphery of the ring structure and the other transducer of each pair of is cooperating transducers may be located externally of the periphery of the ring structure.

The capacitor plates may be arranged in cooperating pairs and at least one cooperating pair of capacitor plates may be located externally of the periphery of the ring structure and one or more other cooperating pair or cooperating pairs of capacitor plates may be located internally of the periphery of the ring structure.

The capacitor plates may be arranged in groups of four and at least one group of four capacitor plates may be located externally of the periphery of the ring structure and the other group or groups of capacitor plates may be arranged internally of the periphery of the ring structure.

The drive transducers or pick-off transducers may be arranged in cooperating pairs and at least one cooperating pair of drive transducers or pick-off transducers may be located internally of the periphery of the ring structure and the other cooperating pair or cooperating pairs of drive transducers or pick-off transducers may be located externally of the periphery of the ring structure.

The vibrating structure gyroscope may include sixteen capacitor plates arranged in groups of four, wherein two of the groups of capacitor plates may be located externally of the periphery of the ring structure and the other two groups of capacitor plates may be located internally of the periphery of the ring structure.

The drive transducers or pick-off transducers may be arranged in cooperating pairs, and two cooperating pairs of drive transducers or pick-off transducers may be located internally of the periphery of the ring structure and the other two cooperating pairs of drive transducers or pick-off transducers may be located externally of the periphery of the ring structure.

Each capacitor plate of a group of four capacitor plates may have a corresponding capacitor plate in each of the other groups of four capacitor plates, and corresponding capacitor plates may be arranged to be connected to a common voltage supply.

The primary and secondary drive transducers, the primary and secondary pick-off transducers, and the capacitor plates may be arranged substantially co-planar with one another and substantially co-planar with the semiconductor substrate.

The support means may include two or more radially compliant legs, each leg may be supported at one end from a central hub of the semiconductor located internally of the ring structure and each leg connected at the other end to the internal periphery of the ring structure. Alternatively, the support means may include two or more radially compliant legs, each leg may be supported at one end from the semiconductor substrate externally of the ring structure and each leg connected at the other end to the external periphery of the ring structure.

The semiconductor substrate maybe sealed between two support substrates to form a sealed cavity encapsulating the ring structure, the support means, the primary and secondary drive transducers, the primary and secondary pick-off transducers and the capacitor plates.

The primary and secondary drive transducers, primary and secondary pick-off transducers and the capacitor plates may be each carried by one of the two support substrates.

The capacitor plates may be arranged in groups of four capacitor plates, the groups of four capacitor plates may be angularly located about the ring structure so that a first group of four capacitor plates substantially coincides with an angle θ of the ring structure, a second group of four capacitor plates substantially coincides with the angle θ offset by 90°, a third group of four capacitor plates substantially coincides with the angle θ offset by 180° and a fourth group of four capacitor plates substantially coincides with the angle θ offset by 270°.

BRIEF DESCRIPTION OF THE DRAWINGS

The invention will now be described, by way of example only, with reference to the accompanying drawings, in which.

DETAILED DESCRIPTION OF THE INVENTION

Figure 2:
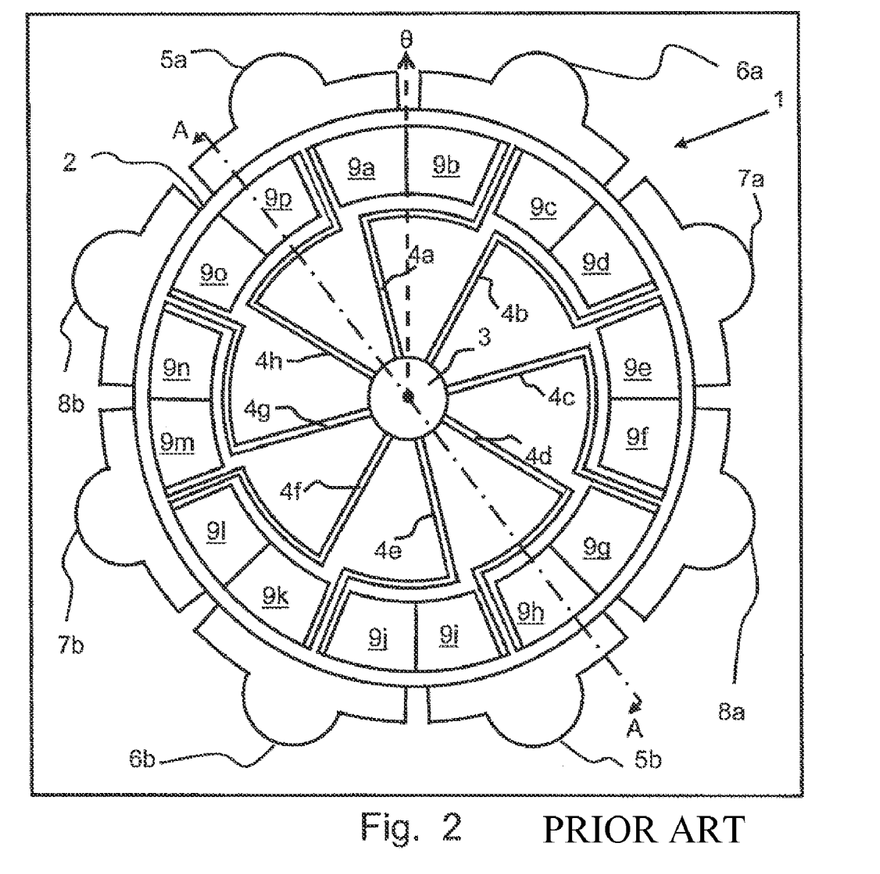
FIG. 2 is a plan view of a ring structure and capacitor plate configuration of a gyroscope according to the prior art.

Referring to FIG. 2, a gyroscope structure 1 as described in WO20061006597 has a ring structure 2 supported from a central hub 3 by eight compliant support legs 4a to 4h. Drive transducers 5a, 5b, 6a and 6b and pick-off transducers 7a, 7b, 8a and 8b are all located around the outer circumference of the ring structure 2 and are each spaced from the ring structure 2 to create a capacitive gap. In closed loop operation, two opposed primary drive transducers 5a and 5b are used to excite the primary motion of the ring structure 2. Excited primary motion is detected by two opposed primary pick-off transducers 7a and 7b. Coriolis induced motion of the ring structure 2 is detected using two opposed secondary pick-off transducers 8a and 8b and such Coriolis induced motion is nulled using two opposed secondary drive transducers 6a and 6b. The gyroscope structure 1 includes sixteen capacitor plates 9a to 9p that are all located within the ring structure 2 and are each spaced from the ring structure 2 to create a capacitive gap. Each capacitor plate 9a to 9p is arranged to generate a predetermined electrostatic force which acts upon the ring structure 2 to locally adjust the stiffness of the ring structure 2.

In an alternative embodiment, the drive transducers 5a, 5b, 6a and 6b and pick-off transducers 7a, 7b, 8a and 8b can all be located around the inner circumference of the ring structure 2 and the capacitor plates 9a to 9p can all be located around the outer circumference of the ring structure 2.

Hence, the scalefactor, $SF_{RATE}$ of the gyroscope structure 1, when operated in the closed loop mode of operation described with reference to FIG. 2, can be given by:

$$SF_{RATE} = \frac{G_B V_0 \omega}{k g_{PPO} g_{SD}} \qquad \text{Equation 1}$$

where $V_0$ is the primary mode amplitude set level, $\omega$ is the primary mode resonance frequency, k is a constant including the resonator dimensions and electronic gains, $G_B$ is the Bryan Factor, that is the modal coupling coefficient, $g_{PPO}$ is the primary pick-off gain and $g_{SD}$ is the secondary drive gain.

The primary pick-off gain $g_{PPO}$ and secondary drive gain $g_{SD}$ will scale with the area of the primary pick-off transducers 7a and 7b and secondary drive transducers 6a and 6b. Accordingly, where the area of the primary pick-off transducers 7a and 7b and secondary drive transducers 6a and 6b is given as A and the gap between the ring structure 2 and the primary pick-off transducers 7a and 7b and secondary drive transducers 6a and 6b is given as d:

$$g_{PPO} \propto g_{SD} \propto \frac{A}{d^2} \qquad \text{Equation 2}$$

From Equations 1 and 2 above, it will be observed that a variation in the gap d, will cause a comparatively large change in the scalefactor which will vary as $d^4$.

Figure 3:
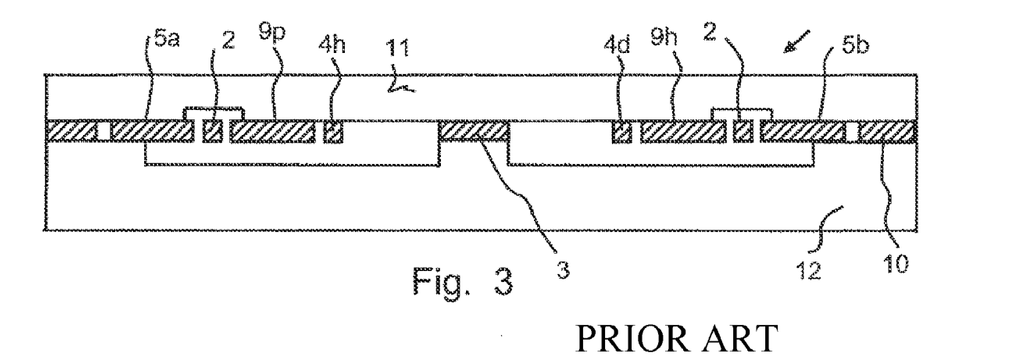
FIG. 3 is a cross-sectional view of the ring structure of FIG. 2 along sectional line A-A, illustrating a supported glass structure and capacitor plate configuration of the gyroscope according to the prior art.

Referring to FIG. 3, in which like references have been used to indicate similar integers to those illustrated in FIG. 2, the ring structure 2 of the gyroscope structure 1 is formed in a layer 10, which is fabricated from bulk crystalline silicon. The ring structure 2 is supported from the central hub 3 and the central hub 3 is rigidly fixed to glass support layers 11 and 12 adjacent to layer 10. Glass support layers 11 and 12 are typically fabricated from Pyrex®. Capacitor plates 9h and 9p, which are also fabricated from crystalline silicon, are directly bonded to the glass support layer 11. Support legs 4d and 4h support the ring structure 2 from the central hub 3.

Accordingly, the as the ambient temperature around the gyroscope structure 1 varies, the dimensions of the gyroscope structure 1 will change due to thermal expansion. The displacement of the ring structure 2, relative to the central hub 3, will be determined by the expansion rate of the silicon material from which it is constructed. The displacement of the primary pick-off transducers 7a and 7b and the secondary drive transducers 6a and 6b, which are rigidly fixed to the layer 11, will be determined by the expansion rate of the glass material used to form the layer 11. The variation in the gap between the ring structure 2 and the primary and secondary drive transducers 5a, 5b, 6a and 6b and primary and secondary pick-off transducers 7a, 7b, 8a and 8b and the variations in the gap between the ring structure 2 and the capacitor plates 9a to 9p, which is typically of the order of 10 microns, is thus determined predominantly by the differential expansion rates of the glass and silicon materials used to form the glass support layer 11 and the ring structure 2, respectively. Over the operating temperature range of the gyroscope structure 1, typically −40 to +85° C., the differential expansion rate between the glass and silicon materials is sufficient to cause variation in the gaps between the ring structure 2 and the primary and secondary drive and pick-off transducers 5a, 5b, 6a, 6b, 7a, 7b, 8a and 8b and variations in the gaps between the ring structure 2 and the capacitor plates 9a to 9p and hence the scalefactor of the gyroscope structure 1.

The temperature dependence of the scalefactor for such a gyroscope structure 1 is expressed as:

$$SF \propto \frac{1}{g_{PPO} g_{SD}} \propto (d + \Delta d)^4 \qquad \text{Equation 3}$$

where $\Delta d$ is the temperature dependent change in gap between the ring structure 2 and each primary pick-off transducer 7a, 7b and each secondary drive transducer 6a, 6b from a nominal room temperature value d. It has been assumed that the gaps between the ring structure 2 and primary pick-off transducers 7a and 7b and secondary drive transducers 6a and 6b, and their variation with temperature, are identical, which is reasonable for the radially symmetric ring structure 2.

The inventor has realised through finite element modelling of the gyroscope structure 1, using values for the expansion coefficients of silicon and glass, that the gap between the ring structure 2 and each primary pick-off transducer 7a, 7b and each secondary drive transducers 6a, 6b will change by approximately 2% over the −40 to +85° C. operating temperature range of the gyroscope structure 1. Due to the $d^4$ dependence, the scalefactor will thus vary by approximately 8% over this temperature range.

Furthermore, the inventor has realised that for a ring structure 2 fabricated precisely from perfectly radially isotropic material, the two operating mode frequencies of the gyroscope structure 1 will be exactly matched. However, practical limitations on the fabrication accuracy and material isotropy typically result in a small residual frequency split between the operating mode frequencies. This residual imperfection will also fix the mode alignment along an arbitrary axis with respect to the angular locations of the drive transducers $5a$, $5b$, $6a$ and $6b$ and pick-off transducers $7a$, $7b$, $8a$ and $8b$ around the ring structure 2. When the ring structure 2 is driven along its primary mode axis, this imperfection will give rise to motion along the secondary mode axis, which is in phase quadrature to motion along the primary mode axis. In normal closed loop operation, this motion will be nulled by means of an appropriately phased secondary drive force applied to the ring structure 2 by the secondary drive transducers $6a$ and $6b$. The magnitude of this force is referred to as the quadrature bias, $\Omega_{Quad}$, and is determined as:

$$\Omega_{Quad} = C \times \Delta F \times \sin 4\alpha \qquad \text{Equation 4}$$

where $\Delta F$ is the mode frequency split, $\alpha$ is the mode angle with respect to the primary drive axis and C is a constant including terms for electronic drive gain and capacitor plate and/or transducer dimensions. Due to the practical limitations of the fabrication process $\Delta F$ will typically be in the range ±10 Hz and can be along any angle, $\alpha$, with respect to the primary drive axis. In order to operate accurately the magnitude of the quadrature bias $\Omega_{Quad}$ must be maintained within certain limits such that it does not exceed the drive capability of the secondary drive transducers $6a$ and $6b$. These limits require that the $\Delta F$ must be adjusted to less than ±1 Hz. This is achieved by means of fixed DC voltages applied to the capacitor plates $9a$ to $9p$ located around the inner circumference of the ring structure 2 to adjust the mode frequencies. This has the effect of applying an electrical spring, which adjusts the overall resonator stiffness and hence the mode frequency, $\omega$, as follows:

$$\omega = \sqrt{\frac{K + K_{Elec}}{m}} \qquad \text{Equation 5}$$

where K is the spring constant of the ring structure 2, $K_{elec}$ is the electrical spring constant and m is the modal mass of the ring structure 2. The electrical spring constant applied by a single capacitor plate $9a$ to $9p$ is given by:

$$K_{Elec} = -\frac{\varepsilon_0 A \Delta V^2}{d^3} \qquad \text{Equation 6}$$

where $\varepsilon_0$ is the permittivity of free space, A is the area of relevant capacitor plate $9a$ to $9p$, $\Delta V$ is the DC voltage difference between the ring structure 2 and the relevant capacitor plate $9a$ to $9p$ and d is the gap distance between the relevant capacitor plate $9a$ to $9p$ and the ring structure 2.

If the control circuitry of the gyroscope structure 1 were perfect, then it would be possible to precisely distinguish between the in-phase force applied to null the Coriolis induced motion and the quadrature nulling force. However, in practice, the control circuitry will not be perfect and a small phase error, $\phi_E$, will exist. This causes a component of the quadrature bias to couple into a rate channel, used as a measure of applied rotation rate, which gives rise to a rate bias error $\Omega_{ERR}$. The magnitude of this error $\Omega_{ERR}$ is given by:

$$\Omega_{ERR} = C \times \Delta F \times \sin 4\alpha \times \sin \phi_E \qquad \text{Equation 7}$$

Figure 4:
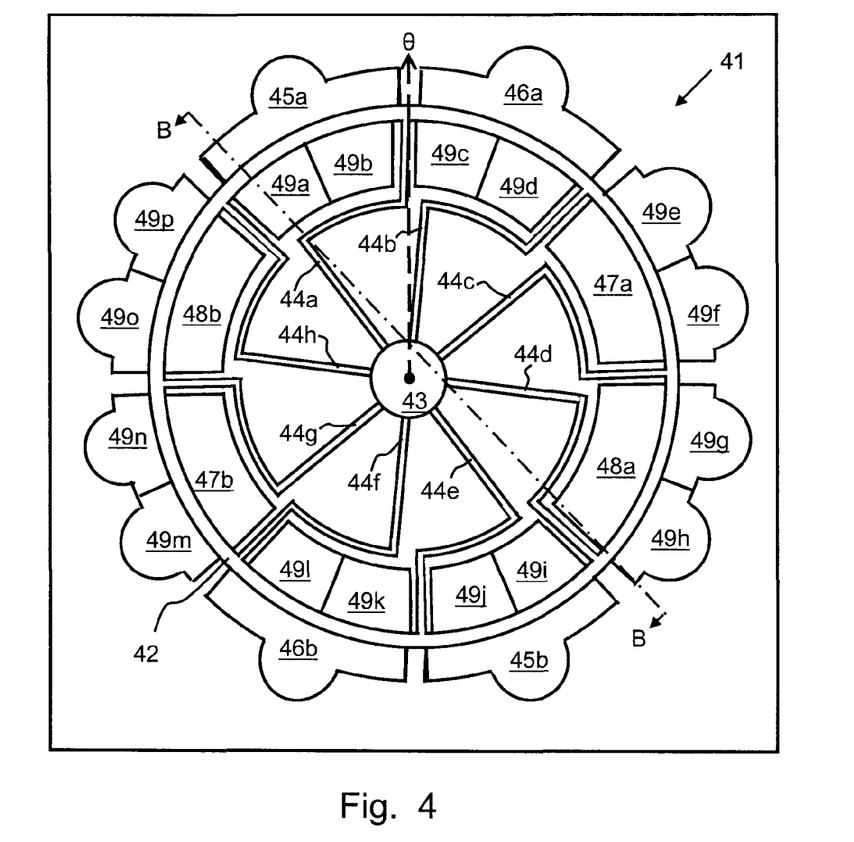
FIG. 4 is a plan view of the ring structure and capacitor plate configuration of a gyroscope according to the present invention.

Referring to FIG. 4, a gyroscope structure 41 includes a ring structure 42 supported from a central hub 43 by eight compliant support legs $44a$ to $44h$. Drive transducers $45a$, $45b$, $46a$ and $46b$ and pick-off transducers $47a$, $47b$, $48a$ and $48b$ are all located around the circumference of the ring structure 42 and are each spaced from the ring structure 42 to create a capacitive gap. It will be noted that primary drive transducers $45a$ and $45b$ and secondary drive transducers $46a$ and $46b$ are all located around and in spaced relationship with the external periphery of the ring structure 42 whereas primary pick-off transducers $47a$ and $47b$ and secondary pick-off transducers $48a$ and $48b$ are all located around and in spaced relationship with the internal periphery of the ring structure 42. In closed loop operation, two opposed primary drive transducers $45a$ and $45b$ are used to excite the primary motion of the ring structure 42. Excited primary motion is detected by two opposed primary pick-off transducers $47a$ and $47b$. Coriolis induced motion of the ring structure 42 is detected using two opposed secondary pick-off transducers $48a$ and $48b$ and such Coriolis induced motion is nulled using two opposed secondary drive transducers $46a$ and $46b$. The value of the drive force generated by the secondary drive transducers $46a$ and $46b$ to maintain the null is a direct indication of the applied rotation rate due to Coriolis induced forces on the gyroscope structure 41.

The gyroscope structure 41 includes sixteen capacitor plates $49a$ to $49p$ that are all located around the periphery of the ring structure 42 and are each spaced from the ring structure 42 to create a capacitive gap. It will be noted that the capacitor plates $49a$ to $49p$ are grouped into four groups of four capacitor plates $49a$ to $49d$, $49e$ to $49h$, $49i$ to $49l$ and $49m$ to $49p$. Furthermore, capacitor plates in groups $49a$ to $49d$ and $49i$ to $49l$ are all located around and in spaced relationship with the internal periphery of the ring structure 42, whereas capacitor plates in groups $49e$ to $49h$ and $49m$ to $49p$ are all located around and in spaced relationship with the external periphery of the ring structure 42. Each capacitor plate $49a$ to $49p$ is arranged to generate a predetermined electrostatic force, which acts upon the ring structure 42 to locally adjust the stiffness of the ring structure 42. One of each group of four capacitor plates $49a$ to $49d$ is angularly located about the ring structure 42 to substantially coincide with an angle $\theta$ of the ring structure 42, another of each group of four capacitor plates $49e$ to $49h$ is angularly located about the ring structure 42 to substantially coincide with angle $\theta$ offset by 90°, another of each group of four capacitor plates $49i$ to $49l$ is angularly located about the ring structure 42 to substantially coincide with angle $\theta$ offset by 180° and the final group of four capacitor plates $49m$ to $49p$ is angularly located about the ring structure 42 to substantially coincide with angle $\theta$ offset 270°.

Figure 5:
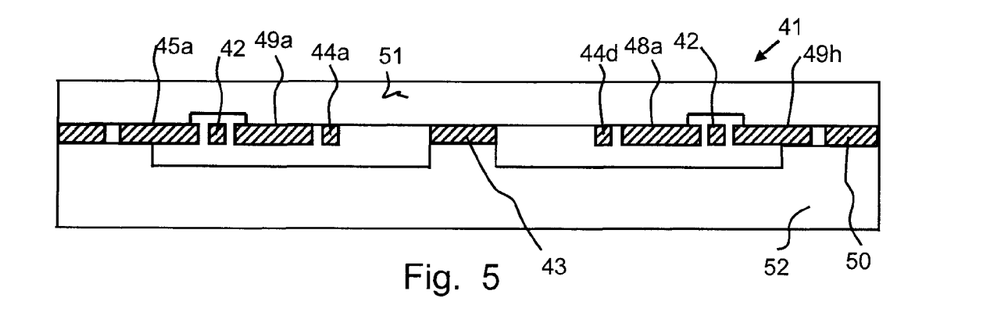
FIG. 5 is a cross-sectional view of the ring structure of FIG. 4 along sectional line B-B, illustrating a supported glass structure and capacitor plate configuration of the gyroscope according to the present invention.

Referring to FIG. 5, in which like references have been used to indicate similar integers to those illustrated in FIG. 4, the ring structure 42 of the gyroscope structure 41 is formed in a layer 50, which is fabricated from bulk crystalline silicon. The ring structure 42 is supported from the central hub 43 and the central hub 43 is rigidly fixed to glass support layers 51 and 52 adjacent to layer 50. Glass support layers 51 and 52 are typically fabricated from Pyrex®. Capacitor plates $49a$ and $49h$, which are also fabricated from crystalline silicon, are directly bonded to the glass support layer 51. Support legs $44a$ and $44d$ support the ring structure 42 from the central hub 43.

FIG. 5 also illustrates the primary drive transducer $45a$ external of the ring structure 42 and capacitor plate $49a$ internal of the ring structure 42 on the left hand side whilst the secondary pick-off transducer $48a$ is internal of the ring structure 42 and the capacitor plate $49h$ is external of the ring structure 42 on the right hand side.

Accordingly, for the primary pick-off transducers 47a and 47b, which are located internally of the ring structure 42, the thermal expansion will result in the opposite variation in the gap distance to that of the secondary drive transducers 46a and 46b positioned external of the ring structure 42. Therefore, as the temperature increases, the gap between each internally located primary pick-off transducers 47a and 47b and the ring structure 42 will decrease by an amount substantially similar to the increase associated with the gap between externally located secondary drive transducers 46a and 46b. It will be recalled that it is the primary pick-off gain $g_{PPO}$ and secondary drive gain $g_{SO}$ that effect scalefactor and this is these parameters which are directly effected by the capacitive gap between the ring structure 42 and each of the primary pick-off transducers 47a and 47b and each of the secondary drive transducers 46a and 46b, respectively. Hence, the effect of gap variations on the scale factor of the gyroscope structure 41 is reduced.

Moreover, the gyroscope structure 41 also reduces the effect of the gap variation between the ring structure 42 and the primary and secondary drive transducers 45a, 45b, 46a and 46b, the primary and secondary pick-off transducers 47a, 47b, 48a and 48b and the capacitor plates 49a to 49p.

For the gyroscope structure 41, the scalefactor temperature variation can now be expressed as:

$$SF \propto \frac{1}{g_{PPO} g_{SD}} \propto (d+\Delta d)^2 (d-\Delta d)^2 \qquad \text{Equation 8}$$

For the gyroscope structure 1 with drive transducers 5a, 5b, 6a and 6b and pick-offs transducers 7a, 7b, 8a and 8b all configured externally of the ring structure 2, as described with reference to FIG. 2, and hence having a scalefactor variation as described by Equation 3, a 2% variation in the distance of the gap (i.e. $\Delta d/d=0.02$) will give rise to approximately an 8% scalefactor change, although the variation in the gap distance will be substantially similar for each transducer 5a, 5b, 6a, 6b, 7a, 7b, 8a, and 8b. However, importantly for a gyroscope structure 41 configured with the secondary drive transducers 46a and 46b located externally of the ring structure 42 and the primary, pick-off transducers 47a and 47b located internally of the ring structure, as described with reference to FIG. 4, and hence having a scalefactor variation as described by Equation 8, a 2% variation in the distance of the gap will give rise to a 0.1% scalefactor change. Comparison of Equations 3 and 8 indicates that it is possible to achieve almost an order of two magnitude improvement in scalefactor.

However, this is only true if the change in gap, $\Delta d$, between external located transducers 45a, 45b, 46a and 46b and capacitive plates 49e to 49h and 49m to 49p and the ring structure 42 and the change in gap $\Delta d$, between internally located transducers 47a, 47b, 48a and 48b and capacitor plates 49a to 49d and 49i to 49l are substantially equal and opposite. In practice, the improvement will be slightly less than predicted for two reasons. First, whilst the surfaces of the transducers 45a, 45b, 46a, 46b, 47a, 47b, 48a and 48b and the capacitor plates 49a to 49p facing the ring structure 42 are spaced at a very similar distance from the centre of the hub 43, internally located transducers 47a, 47b, 48a and 48b and capacitor plates 49a to 49d and 49i to 49l are separated from externally located transducers 45a, 45b, 46a and 46b and capacitor plates 49e to 49h and 49m to 49p by the width of the ring structure 42. This means that the thermal expansion acts over a slightly greater distance for the externally located transducers 45a, 45b, 46a and 46b and capacitor plates 49e to 49h and 49m to 49p, which will thus experience a slightly greater change in gap size compared to that experienced by internally located transducers 47a, 47b, 48a and 48b and capacitor plates 49a to 49d and 49i to 49l. Secondly, the area of the silicon layer 50 bonded to the glass layer 51 will constrain the expansion of the glass layer 51, thus perturbing the expansion rates for the two layers 50 and 51.

In FIG. 4, each pick-off transducer 47a, 47b, 48a and 48b has been located internally of the ring structure 42 in a place conventionally occupied by a capacitor plate. Capacitor plates 49e to 49h and 49m to 49p have been located externally of the ring structure 42 in a position conventionally occupied by a pick-off transducer.

The effect of the temperature dependent variation in the gap between a capacitor plate 49a to 49p and the ring structure 42 and on the electrostatic force generated by the capacitor plates 49a to 49p, which is used to balance the ring structure 42 will also be improved in a similar manner to the scalefactor dependence.

For the gyroscope structure 1 shown in FIG. 2, the capacitor plates 9a to 9p are utilised in sets of four, wherein plates located at angles $\theta$, $\theta+90°$, $\theta+180°$ and $\theta+270°$ have common voltages applied. It will be noted that angle $\theta$ is measured from the primary mode axis of the gyroscope structure 1. The temperature dependence of the electrical spring constant, $k_{Elec}$, for a single set of four plates, is therefore expressed as:

$$k_{Elec} \propto \frac{4A}{(d-\Delta d)^3} \qquad \text{Equation 9}$$

Accordingly, for a 2% variation in the gap, $k_{Elec}$ will vary by 6%, which can give rise to a significant variation in the quadrature bias over the operating temperature range of the gyroscope structure 1.

When the capacitor plates 49a to 49p are reconfigured as for the gyroscope structure 41 shown in FIG. 4, the temperature dependency of the spring constant $k_{Elec}$ becomes:

$$k_{Elec} \propto \frac{2A}{(d+\Delta d)^3} + \frac{2A}{(d-\Delta d)^3} \qquad \text{Equation 10}$$

The variation in the gap is reduced to approximately 0.2%, giving a substantial reduction in the quadrature bias variation which, in turn, leads to a significant improvement in the rate bias stability.

Accordingly, such improvements in the scalefactor and quadrature bias can be achieved in the gyroscope structure 41.

Although the apparatus of FIG. 4 illustrates that each pick-off transducer 47a, 47b, 48a and 48b can be located internally of the ring structure 42 and each of the capacitor plates 49e to 49h and 49m to 49p can be located externally of the ring structure 42, with each drive transducer 45a, 45b, 46a and 46b located externally of the ring structure 42 and each of the capacitor plates 49a to 49d and 49i to 49l located internally of the ring structure 42, it will be understood that, each drive transducer 45a, 45b, 46a and 46b can be located internally of the ring structure 42 in a place conventionally occupied by a capacitor plate and capacitor plates 49a to 49d and 49i to 49l can in turn be located externally of the ring structure 42 in the position conventional occupied by a drive transducer, with each pick-off transducer 47a, 47b, 48a and 48b located externally of the ring structure 42 and each capacitor plate 49e to 49h and 49m to 49p located internally of the ring structure 42.

As a further alternative, only some of the drive transducers and some of the pick transducers can be located internally of the ring structure in a place conventionally occupied by a capacitor plate and capacitor plates can in turn be located externally of the ring structure in the position conventional occupied by a drive or pick-off transducer.

It will be understood that the ring structure 42 can be substantially circular, curved, hooped, polygon or the like shaped structure.

Furthermore, it will be understood that the silicon real estate of the layer 50 within the ring structure 42 can also be used to provide circuitry which can be used in conjunction with transducers located internally of the ring structure, thereby making better use of the silicon real estate. For example, the layer 50 within the ring structure can be used to provide JFET amplifiers for the signal outputted from one or of the pick-off transducers 47a, 47b, 48a or 48b.

The invention claimed is:

1. A vibrating structure gyroscope, including:
   a semiconductor substrate;
   a vibrating planar ring structure;
   support means arranged to support the ring structure relative to the semiconductor substrate;
   the semiconductor substrate, the ring structure and the support means being arranged substantially co-planar with one another;
   at least one primary drive transducer arranged to cause the ring structure to oscillate in a primary mode at the resonant frequency of the primary mode;
   at least one primary pick-off transducer arranged to detect oscillation of the ring structure in the primary mode;
   at least one secondary pick-off transducer arranged to detect oscillation of a secondary mode induced when angular velocity is applied around an axis substantially perpendicular to the ring structure;
   at least one secondary drive transducer arranged to null the induced secondary mode oscillation;
   the primary and secondary drive transducers and the primary and secondary pick-off transducers all being arranged around a periphery of the ring structure and at least two oscillation frequency adjusting capacitor plates arranged around the periphery of the ring structure such that when a voltage is applied between at least one capacitor plate and the ring structure an electrostatic force is generated between the capacitor plate and the ring structure to differentially adjust the frequencies of the primary and secondary modes to reduce the difference between the frequencies of the primary and secondary modes;
   wherein capacitor plates are adjacent to each other and positioned as groups at specified locations external to the periphery of the ring structure, and other capacitor plates are adjacent to each other and positioned as groups at specified locations internal to the periphery of the ring structure, and wherein a plurality of the drive transducers or the pick-off transducers include drive transducers or pick-off transducers being adjacent to each other and positioned as groups at specified locations internal to the periphery of the ring structure and the other drive transducers or the pick-off transducers being adjacent to each other and positioned as groups at specified locations external to the periphery of the ring structure.

2. A vibrating structure gyroscope, as claimed in claim 1, wherein the capacitor plates are arranged in cooperating pairs and at least one capacitor plate of each cooperating pair of capacitor plates is located externally of the periphery of the ring structure and the other capacitor plate of each cooperating pair of capacitor plates is located internally of the periphery of the ring structure.

3. A vibrating structure gyroscope, as claimed in claim 1, wherein either the drive transducers or the pick-off transducers are arranged in pairs of cooperating transducers wherein each pair is located internally of the periphery of the ring structure or externally of the periphery of the ring sturcture, and at least one transducer of each pair of cooperating transducers is located internally of the periphery of the ring structure and another transducer of each pair of cooperating transducers is located externally of the periphery of the ring structure.

4. A vibrating structure gyroscope, as claimed in claim 1, wherein the capacitor plates are arranged in cooperating pairs and at least one cooperating pair of capacitor plates is located externally of the periphery of the ring structure and one or more other cooperating pair or cooperating pairs of capacitor plates are located internally of the periphery of the ring structure.

5. A vibrating structure gyroscope, as claimed in claim 1, wherein the capacitor plates are arranged in groups of four and at least one group of four capacitor plates is located externally of the periphery of the ring structure and the other group or groups of capacitor plates are arranged internally of the periphery of the ring structure.

6. A vibrating structure gyroscope, as claimed in claim 1, wherein the drive transducers or pick-off transducers are arranged in cooperating pairs and at least one cooperating pair of drive transducers or pick-off transducers is located internally of the periphery of the ring structure and the other cooperating pair or cooperating pairs of drive transducers or pick-off transducers are located externally of the periphery of the ring structure.

7. A vibrating structure gyroscope, as claimed in claim 1, including sixteen capacitor plates arranged in groups of four, wherein two of the groups of capacitor plates are located externally of the periphery of the ring structure and the other two groups of capacitor plates are located internally of the periphery of the ring structure.

8. A vibrating structure gyroscope, as claimed in claim 7, wherein the drive transducers or the pick-off transducers are arranged in cooperating pairs, and two cooperating pairs of drive transducers or pick-off transducers are located internally of the periphery of the ring structure and the other two cooperating pairs of drive transducers or pick-off transducers are located externally of the periphery of the ring structure.

9. A vibrating structure gyroscope, as claimed in claim 7, wherein each capacitor plate of a group of four capacitor plates has a corresponding capacitor plate in each of the other groups of four capacitor plates, and corresponding capacitor plates are arranged to be connected to a common voltage supply.

10. A vibrating structure gyroscope, as claimed in claim 1, wherein the primary and secondary drive transducers, the primary and secondary pick-off transducers, and the capacitor plates are arranged substantially co-planar with one another and substantially co-planar with the semiconductor substrate.

11. A vibrating structure gyroscope, as claimed in claim 1, wherein the support means includes two or more radially compliant legs, each leg being supported at one end from a central hub of the semiconductor substrate located internally of the ring structure and each leg connected at the other end to the internal periphery of the ring structure.

12. A vibrating structure gyroscope, as claimed in claim 1, wherein the support means includes two or more radially compliant legs, each leg being supported at one end from the semiconductor substrate externally of the ring structure and each leg connected at the other end to the external periphery of the ring structure.

13. A vibrating structure gyroscope, as claimed in claim 1, wherein the semiconductor substrate is sealed between two support substrates to form a sealed cavity encapsulating the ring structure, the support means, the primary and secondary drive transducers, the primary and secondary pick-off transducers and the capacitor plates.

14. A vibrating structure gyroscope, as claimed in claim 13, wherein the primary and secondary drive transducers, the primary and secondary pick-off transducers and the capacitor plates are each carried by one of the two support substrates.

15. A vibrating structure gyroscope, as claimed in any claim 1, wherein the capacitor plates are arranged in groups of four capacitor plates, the groups of four capacitor plates being angularly located about the ring structure so that a first group of four capacitor plates substantially coincides with an angle $\theta$ of the ring structure, a second group of four capacitor plates substantially coincides with the angle $\theta$ offset by 90°, a third group of four capacitor plates substantially coincides with the angle $\theta$ offset by 180° and a fourth group of four capacitor plates substantially coincides with the angle $\theta$ offset by 270°.

\* \* \* \* \*